US011228772B2

(12) United States Patent
Nagori et al.

(10) Patent No.: US 11,228,772 B2
(45) Date of Patent: Jan. 18, 2022

(54) RATE CONTROL IN VIDEO CODING

(71) Applicant: Texas Instruments Incorporated, Dallas, TX (US)

(72) Inventors: Soyeb Nagori, Bangalore (IN); Arun Shankar Kudana, Bangalore (IN); Manu Mathew, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/075,053

(22) Filed: Oct. 20, 2020

(65) Prior Publication Data

US 2021/0037252 A1 Feb. 4, 2021

Related U.S. Application Data

(63) Continuation of application No. 13/084,572, filed on Apr. 12, 2011, now abandoned.
(Continued)

(51) Int. Cl.
*H04N 19/196* (2014.01)
*H04N 19/142* (2014.01)
(Continued)

(52) U.S. Cl.
CPC ......... *H04N 19/198* (2014.11); *H04N 19/126* (2014.11); *H04N 19/142* (2014.11);
(Continued)

(58) Field of Classification Search
CPC ... H04N 19/126; H04N 19/198; H04N 19/177
See application file for complete search history.

(56) References Cited

U.S. PATENT DOCUMENTS 5,872,598 A 2/1999 Legall et al.
6,011,589 A 1/2000 Matsuura et al.
(Continued)

FOREIGN PATENT DOCUMENTS

CN 101069432 A 11/2007
CN 10461248 A 6/2009
(Continued)

OTHER PUBLICATIONS

Telenor Research, "Video CODEC Test Model, TMNS", ITU Telecommunication Standardization Sector, Study Group 15, Working Party 15/1, Expert's Group on Very Low Bitrate Visual Telephony, Tellnor Research, Jan. 31, 1995, pp. 1-16.
(Continued)

*Primary Examiner* — Zhubing Ren
(74) *Attorney, Agent, or Firm* — Charles F. Koch; Charles A. Brill; Frank D. Cimino

(57) ABSTRACT

A method of rate control in coding of a video sequence to generate a compressed bit stream is provided that includes computing a sequence base quantization step size for a sequence of pictures in the video sequence, computing a picture base quantization step size for a picture in the sequence of pictures based on the sequence base quantization step size, a type of the picture, and a level of the picture in a rate control hierarchy, and coding the picture using the picture base quantization step size to generate a portion of the compressed bit stream.

20 Claims, 9 Drawing Sheets

Related U.S. Application Data

(60) Provisional application No. 61/324,425, filed on Apr. 15, 2010.

(51) Int. Cl.
*H04N 19/177* (2014.01)
*H04N 19/152* (2014.01)
*H04N 19/126* (2014.01)

(52) U.S. Cl.
CPC ......... *H04N 19/152* (2014.11); *H04N 19/177* (2014.11); *H04N 19/196* (2014.11)

(56) References Cited

U.S. PATENT DOCUMENTS

| | | | |
|---|---|---|---|
| 6,016,162 | A | 1/2000 | Odaka et al. |
| 6,493,388 | B1 | 12/2002 | Wang |
| 6,879,632 | B1 | 4/2005 | Yokoyama |
| 2004/0013202 | A1 | 1/2004 | Lainema |
| 2006/0056508 | A1 | 3/2006 | Lafon et al. |
| 2006/0114989 | A1 | 6/2006 | Panda |
| 2006/0203907 | A1 | 9/2006 | Yang et al. |
| 2007/0025441 | A1* | 2/2007 | Ugur ............... H04N 19/174 375/240.03 |
| 2007/0074266 | A1* | 3/2007 | Raveendran ....... H04N 19/36 725/135 |
| 2007/0280349 | A1 | 12/2007 | Prieto et al. |
| 2008/0095232 | A1 | 4/2008 | Boice et al. |
| 2008/0225943 | A1 | 9/2008 | Boice et al. |
| 2008/0310516 | A1 | 12/2008 | Kobayashi et al. |
| 2009/0086816 | A1* | 4/2009 | Leontaris ........... H04N 19/15 375/240.03 |
| 2009/0304080 | A1 | 12/2009 | Francois et al. |
| 2011/0051806 | A1 | 3/2011 | Lee |

FOREIGN PATENT DOCUMENTS

| | | |
|---|---|---|
| CN | 101562497 A | 10/2009 |
| JP | 2008-522546 A | 6/2008 |

OTHER PUBLICATIONS

S. Nagori, et al., "Transmission Bit-Rate Control in a Video Encoder", U.S. Appl. No. 12/938,397, filed Nov. 3, 2010, pp. 1-30.

L. Xu, et al., "Rate Control for Hierarchical B-picture Coding with Scaling-factors", IEEE International Symposium on Circuits and Systems, May 27-30, 2007, New Orleans, LA, pp. 49-52.

M. Rezaei, et al., "Video Rate Control for Streaming and Local Recording Optimized for Mobile Devices", IEEE 16th International Symposium on Personal, Indoor and Mobile Radio Communications, Sep. 11-14, 2005, vol. 4, Berlin, Germany, pp. 2284-2288.

K.T. Ng, et al., "A Modified H.263 Algorithm Using Bit Allocation Buffer Control Algorithm", IEEE International Symposium on Circuits and Systems, Jun. 9-12, 1997, Hong Kong, pp. 1389-1392.

S. Milani, et al., "An Accurate Low-Complexity Rate Control Algorithm Based on (p, Eq)-Domain", IEEE Transactions on Circuits and Systems for Video Technology, vol. 18, No. 2, Feb. 2008, pp. 257-262.

P. Hsu and K.J.R. Liu, "A Predictive H.263 Bit-Rate Control Scheme Based on Scene Information", International Conference on Multimedia Computing and Systems, Jul.-Aug. 2000, New York, NY, pp. 1735-1738.

The State Intellectual Property Office of P.R.C. Search Report, 2 pages.

Li et al., Signal Processing: Image Communication 24, Dec. 31, 2009, pp. 179-199.

The State Intellectual Property Office of P.R.C. Search Report; Chinese Application No. 201180019076.3; dated May 29, 2015.

Notification of Transmittal of the International Search Report and the Written Opinion of the International Searching Authority, or the Declaration; PCT/US2011/032753; dated Dec. 20, 2011.

* cited by examiner

RATE CONTROL IN VIDEO CODING

CROSS-REFERENCE TO RELATED APPLICATIONS

This application is a continuation of U.S. Non-Provisional patent application Ser. No. 13/084,572, filed Apr. 12, 2011, which claims benefit of U.S. Provisional Patent Application Ser. No. 61/324,425, filed Apr. 15, 2010, both of which are incorporated by reference herein in their entirety.

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays, and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. Codecs may be, for example, industry standards such as MPEG-2, MPEG-4, H.264/AVC, etc. and the standard currently under development, HEVC. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block of a picture.

Such block-based encoding techniques are inherently lossy as they achieve compression by both removing redundant information and by making small quality compromises that are meant to minimally perceptible in the decoded video sequence. In particular, a quantization step size (Qs) regulates how much spatial detail is retained in a compressed coding block. The smaller the Qs, the more retention of detail and the better the quality but at the cost of a higher bit rate. As the Qs increases, less detail is retained and the bit rate decreases but at the cost of increased distortion and loss of quality.

Rate control is an important part of any video encoder. Rate control attempts to maximize the perceived quality of encoded video when decoded by managing the number of bits used to encode each picture. That is, rate control dynamically adjusts various encoder parameters, e.g., the Qs, to achieve a target bit rate in the compressed bit stream in view of the current fullness of the output buffer.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1A:
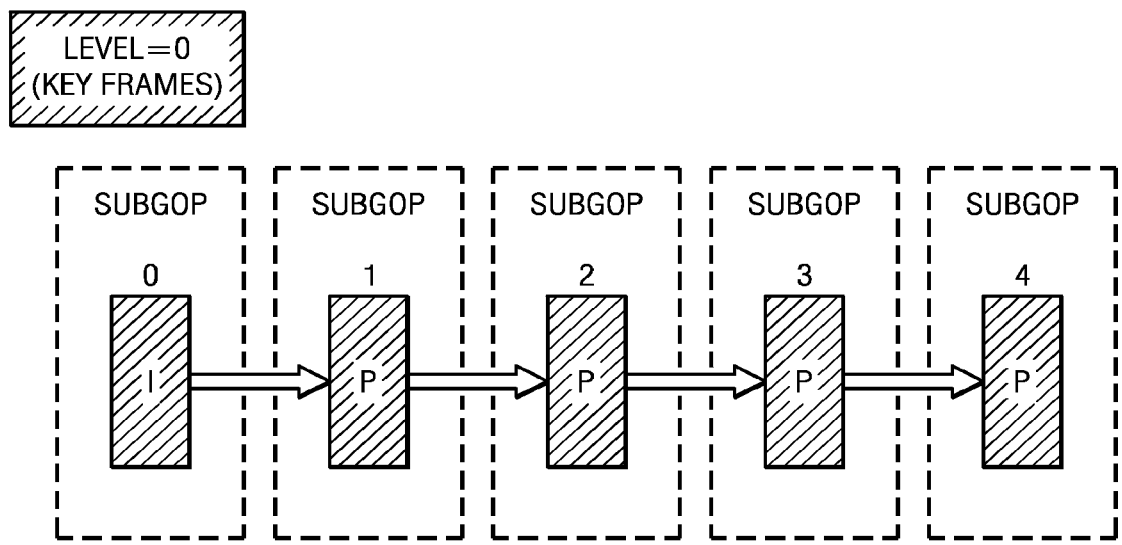
FIGS. 1A-1E show examples in accordance with one or more embodiments.

Specific embodiments will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments, numerous specific details are set forth in order to provide a more thorough understanding of the embodiments. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments should not be considered limited to the specific ordering of steps shown in the figures and/or described herein. Further, embodiments should not be considered limited to any particular video coding standard.

As used herein, the term "picture" refers to a frame or a field of a frame. A frame is a complete image captured during a known time interval. When a video sequence is in progressive format, the term picture refers to a complete frame. When a video sequence is in interlaced format, each frame is composed of a field of odd-numbered scanning lines followed by a field of even-numbered lines. Each of these fields is a picture. Further, an I-picture is an intra-coded picture, a P-picture is an inter-coded picture predicted from another I-picture or P-picture, e.g., a previous I-picture or P-picture, and a B-picture is an inter-coded picture predicted using two pictures, e.g., a previous I-picture or P-picture and a following I-picture or P-picture. In general, a group of pictures (GOP) is a group of successive pictures in a video sequence and a GOP structure specifies how each picture in the GOP is to be coded, i.e., whether a given picture is to be coded as an I-picture, P-picture, or B-picture.

Figure 1B:
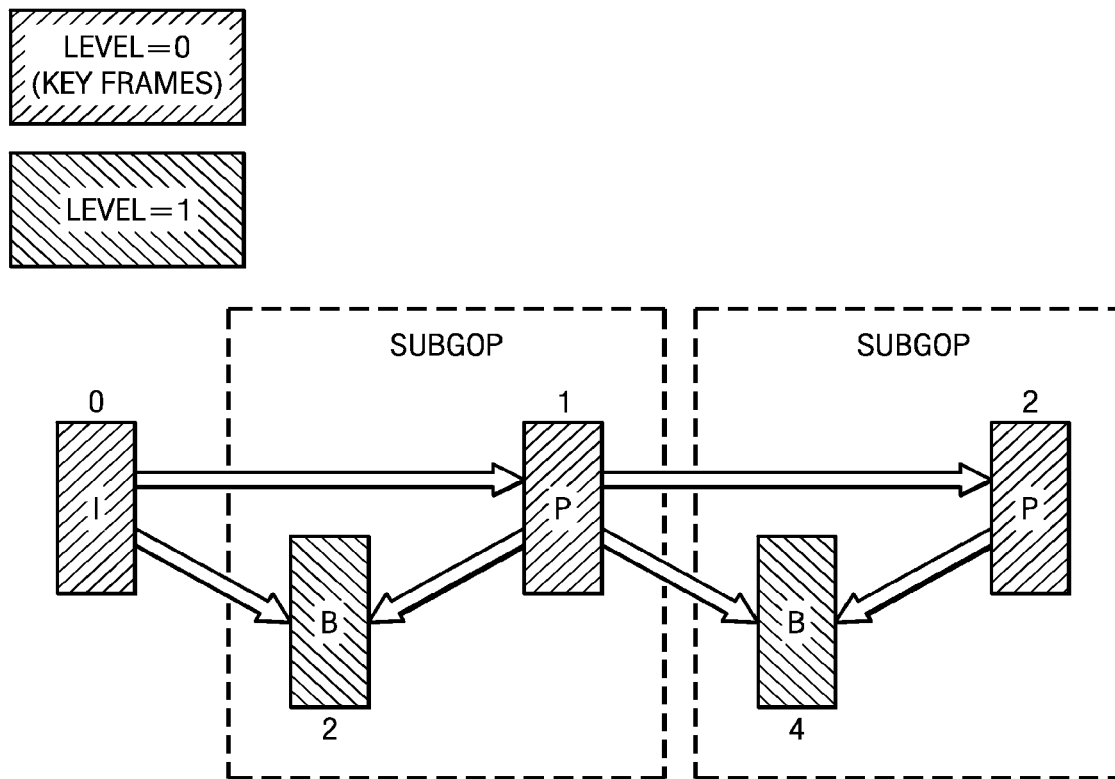
Figure 1C:
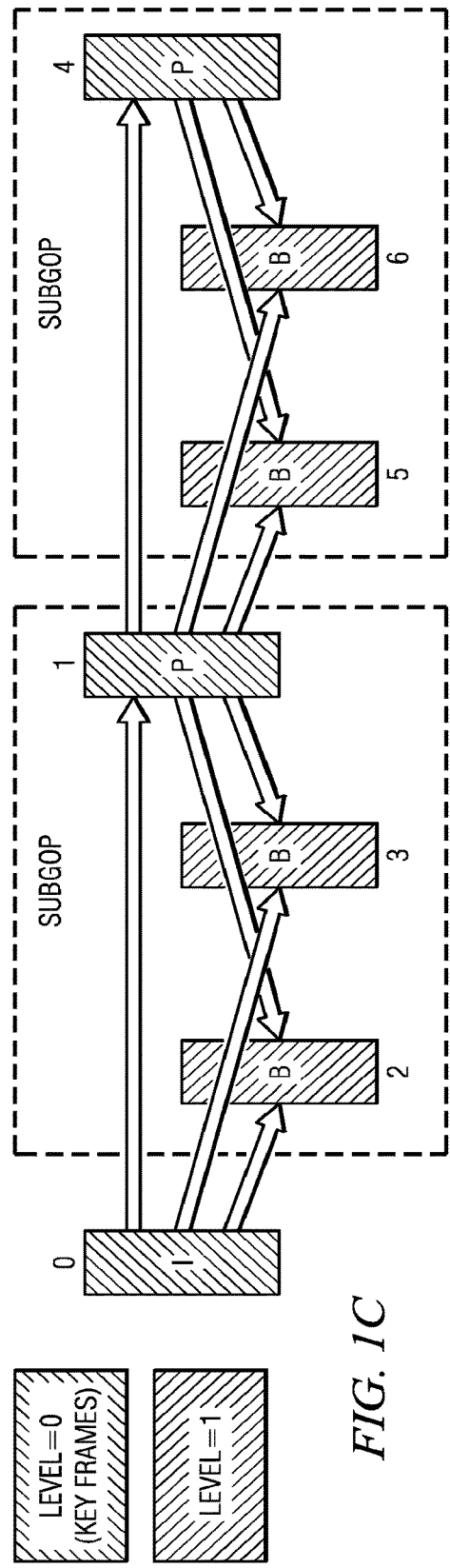
Figure 1D:
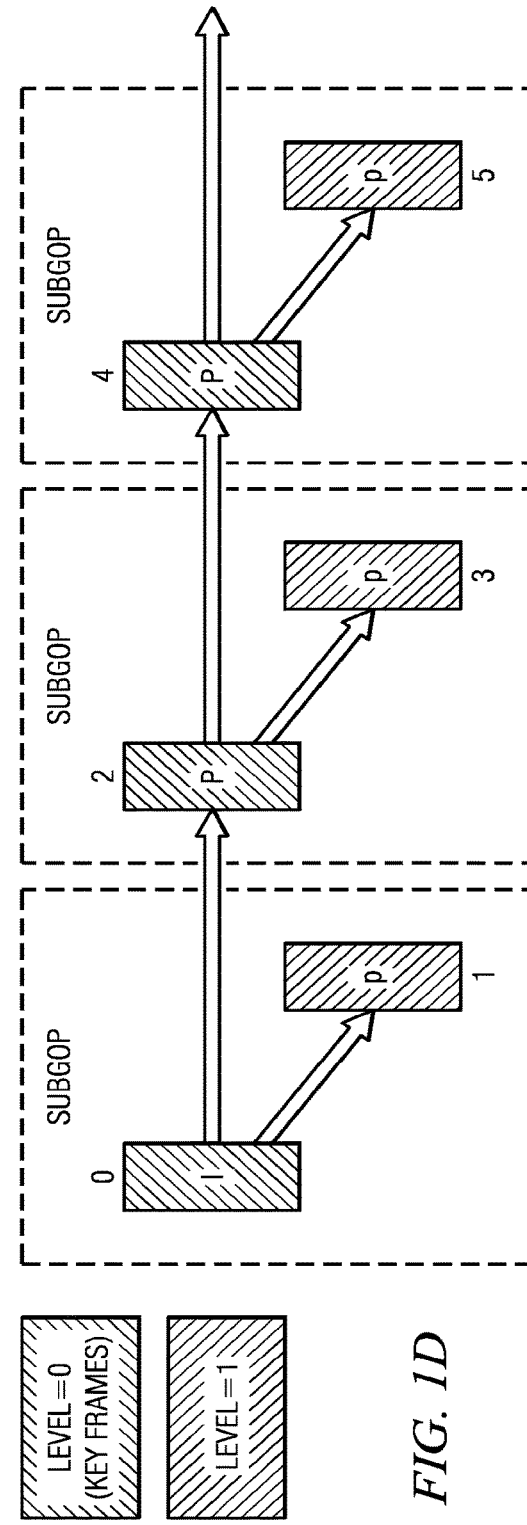
Figure 1E:
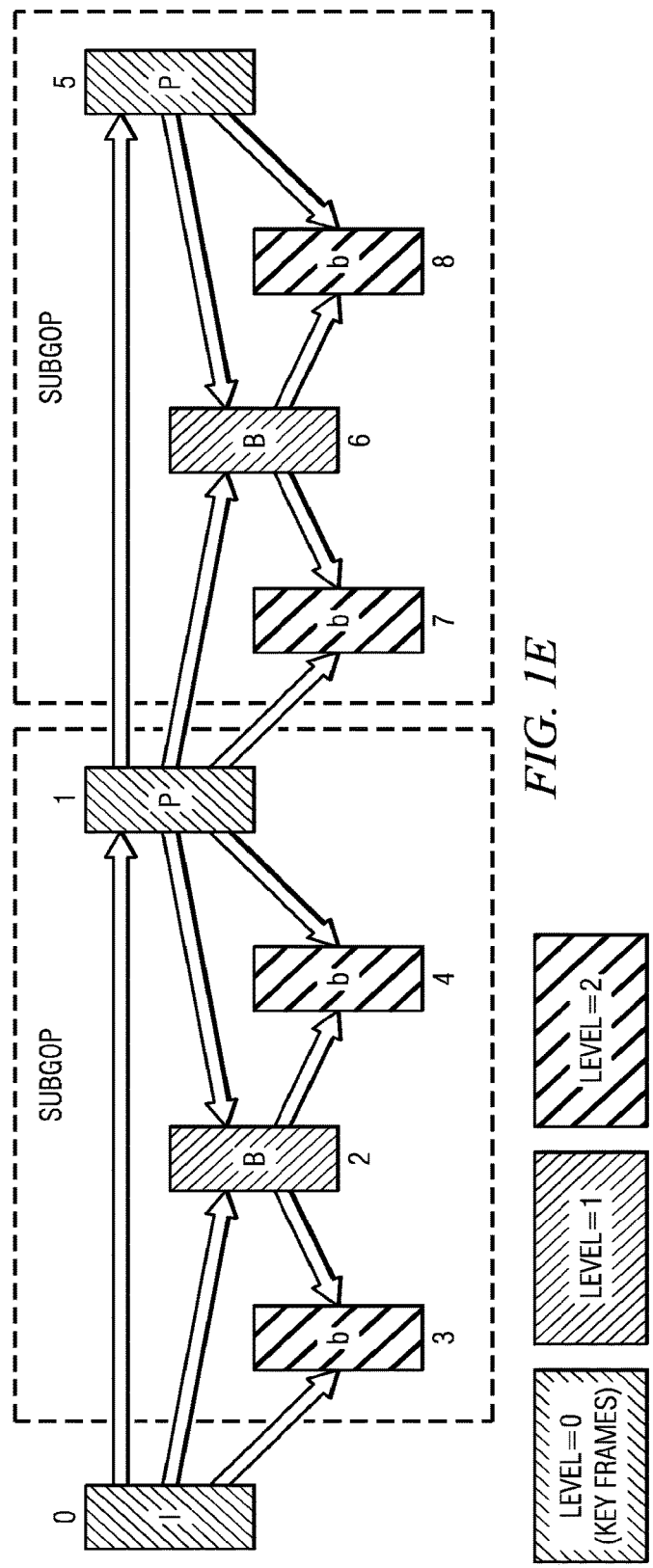

If the GOP structure is non-hierarchical, each GOP begins with an I-picture and includes all pictures until the next I-picture. The pictures between the two I-pictures may be some defined sequence of P-pictures and/or B-pictures, depending on the particular GOP structure. Examples of such GOPs are shown in FIGS. 1A-1C. If the GOP structure is hierarchical, e.g., hierarchical-B, a GOP is defined to be a key picture and all pictures that are temporally located between that key picture and the previous key picture. A key picture may be intra-coded, i.e., an I-picture, or inter-coded using a previous key picture, i.e., a P-picture. The other pictures in the GOP are hierarchically predicted. In a GOP with a hierarchical-B coding structure, the other pictures in the GOP are B-pictures. In a GOP with a hierarchical-P coding structure, the other pictures in the GOP are P-pictures. Examples of GOPs with hierarchical-P and hierarchical-B coding structures are shown in FIGS. 1D and 1E, respectively.

Many rate control techniques used in video coding, e.g., rate control techniques based on the H.263 test model near-term 5 (TMN5), assume that only I-pictures and P-pictures occur in a video sequence. Further, such techniques may modulate the base quantization step size (Qs) at the picture level. That is, the base Qs for a P-picture is set to be the average Qs used in coding the previous P-picture. This base Qs is then modulated prior to coding the picture based on whether the number of bits used in coding the previous P-picture was above or below a target number of bits. The resulting base Qs is then used as a starting point for determining the actual Qs used in coding each coding block in the picture. Further, during the coding of a picture, the Qs may be increased or decreased periodically based on how close an estimated coded size of the picture is to the target coded size for a picture.

Such rate control techniques may provide good results with progressive coding (where a picture is a frame of a video sequence) where a group of pictures (GOP) has a structure of an I-picture followed by some number of P-pictures and complexity from picture to picture does not change much. However, such rate control techniques may not be sufficient for GOP structures that include B-pictures and/or have a hierarchical coding structure.

Embodiments of the invention provide rate control that determines and modulates the base Qs at the beginning of sequences of pictures rather than at the beginning of each picture. Further, the sequence base Qs is determined and modulated differently based on the type of the initial picture (e.g., I-picture or P-picture) in the sequence of pictures. The sequence base Qs is then used to determine a base Qs for each picture in the sequence. The picture base Qs for a picture may be adapted from the sequence base Qs based on the picture type and the level of the picture in the rate control hierarchy. Further, in one or more embodiments, prior to coding a picture, a minimum and maximum coded size is computed for the picture based on various criteria. Then, rate control at the sub-picture level, i.e., for sequences of coding blocks in a picture, determines a base Qs for a sequence of coding blocks in the picture, e.g., a row, based on the picture base Qs and the minimum and maximum coded sizes. More specifically, the coded size of the picture is estimated at the beginning of a sequence of coding blocks and this sub-picture base Qs may be increased or decreased as appropriate if the estimated coded size of the picture violates the minimum or maximum coded size. No particular GOP structure is required and a GOP may include B-pictures and/or may have a hierarchical coding structure.

To mitigate possible quality degradation when a scene change occurs in a video sequence, some embodiments recognize when a scene change has occurred and take steps to manage the Qs in the initial non-scene-change picture after a scene change is detected. As is explained in more detail herein, rate control may adapt the minimum and maximum coded sizes at the beginning of each coding block sequence when a scene change was detected in the previous picture and no scene change has been detected in the picture being coded at that point in time. An average Qs value used for the coding block sequences from this non-scene-change picture is then set to be the sequence base Qs for the sequence of pictures containing the non-scene-change picture.

The frame sequences used by embodiments of the rate control are referred to as subGOPs herein. For purposes of determining a subGOP, frames in a video sequence are viewed as being at different levels in a rate control hierarchy. The levels in the rate control hierarchy are defined as follows. Level 0 frames, also referred to as key frames, may be used by for prediction of other level 0 frames. Further, a predicted level 0 frame may only use other level 0 pictures as reference frames. Pictures in level n (n>0) may be predicted from frames in level n−1 and below (n>0) and may be used as for prediction of frames in levels n+1 and above (n>0). A subGOP is a sequence of frames that begins with a level 0 frame, i.e., a key frame, and ends with the last frame before the next level 0 picture. This ensures that there is only one level 0 frame in a subGOP, and that level 0 frame is the first frame in the subGOP (in coding order, not display order.

FIGS. 1A-1E show examples of various GOP structures and identifies subGOPS in relation to the GOP structures. FIGS. 1A-1C are examples of non-hierarchical GOP structures and FIGS. 1D and 1E are examples of hierarchical GOP structures. More specifically, FIG. 1A is an example of an IPPP coding structure, FIG. 1B is an example of an IBP coding structure, FIG. 1C is an example of an IBBP coding structure, FIG. 1D is an example of a hierarchical-P coding structure, and FIG. 1E is an example of a hierarchical-B coding structure. In each of these figures, the pictures are shown in display order and the numbers above or below each picture identify the coding order of that picture.

In the rate control hierarchy, there are two types of subGOPs, an I-subGOP and a P-subGOP. An I-subGOP is a subGOP in which the initial picture is an I-picture and a P-subGOP is a subGOP in which the initial picture is a P-picture. As is explained in more detail herein, in one or more embodiments, the sequence base Qs for an I-subGOP is determined differently than that of a P-subGOP.

Figure 2:
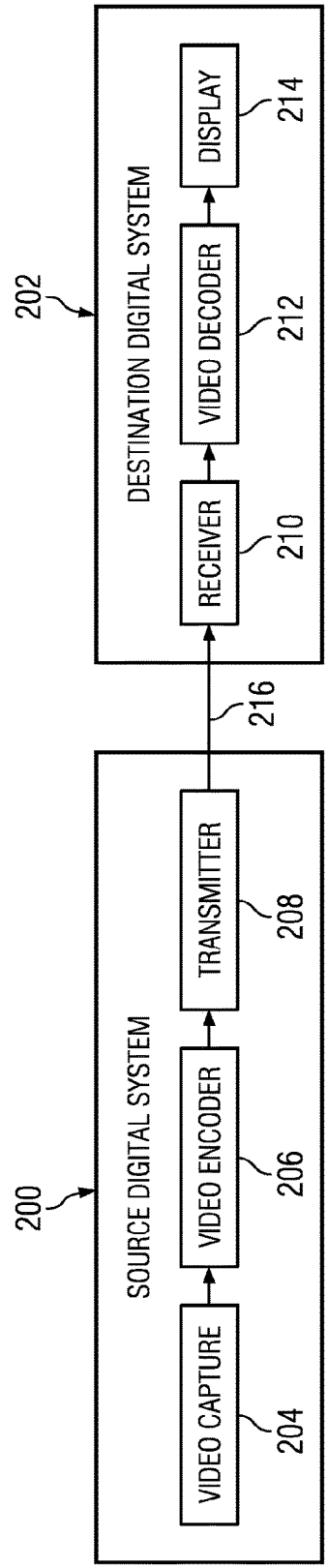
FIG. 2 shows a block diagram of a digital system in accordance with one or more embodiments.

FIG. 2 shows a block diagram of a digital system in accordance with one or more embodiments. The system includes a source digital system 200 that transmits encoded video sequences to a destination digital system 202 via a communication channel 216. The source digital system 200 includes a video capture component 204, a video encoder component 206 and a transmitter component 208. The video capture component 204 is configured to provide a video sequence to be encoded by the video encoder component 206. The video capture component 204 may be for example, a video camera, a video archive, or a video feed from a video content provider. In some embodiments, the video capture component 204 may generate computer graphics as the video sequence, or a combination of live video and computer-generated video.

The video encoder component 206 receives a video sequence from the video capture component 204 and encodes it for transmission by the transmitter component 208 and/or for storage in a storage component (not shown). In general, the video encoder component 206 receives the video sequence from the video capture component 204 as a sequence of pictures, divides the pictures into coding blocks which may be a whole picture or a part of a picture, divides the coding blocks into prediction blocks, and encodes the video data in the coding blocks based on the prediction blocks. During the encoding process, a method for rate control as described herein may be performed. The functionality of embodiments of the video encoder component 206 is described in more detail below in reference to FIGS. 3A and 3B.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. In general, the video decoder component 212 reverses the encoding process performed by the video encoder component 206 to reconstruct the coding blocks of the video sequence. The reconstructed video sequence may then be displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video steaming, video broadcasting, and video telephony. Further, the video encoder component 206 and the video decoder component 212 may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263, H.264 and HEVC, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
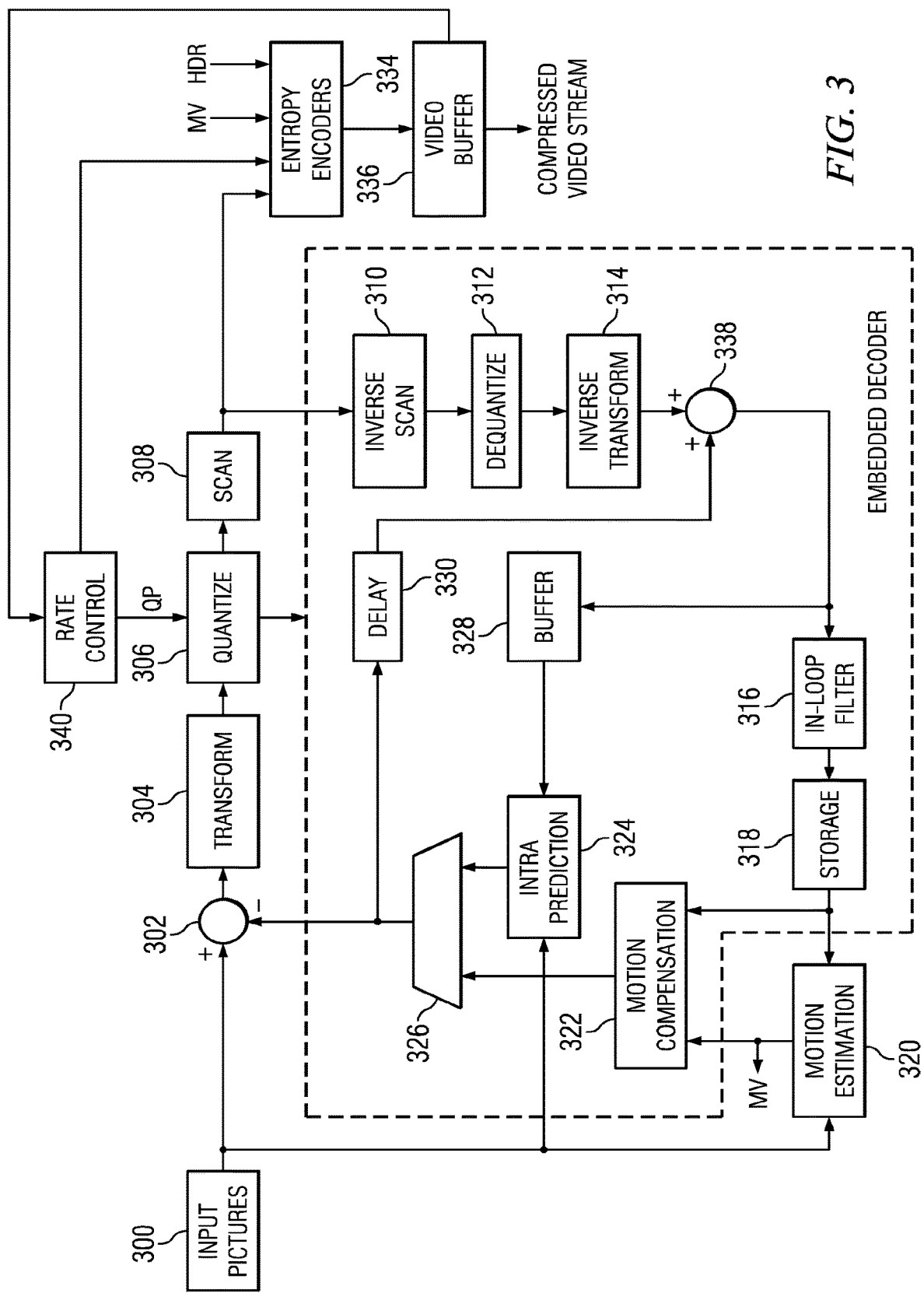
FIG. 3 shows a block diagram of a video encoder in accordance with one or more embodiments.

FIG. 3 shows a block diagram of a video encoder, e.g., the video encoder 206 of FIG. 2, configured to perform rate control in accordance with one or more embodiments. For illustrative purposes, the block coding architecture shown is that of an H.264 video encoder. As shown in FIG. 3, input pictures 300 for encoding are divided into coding blocks, e.g., macroblocks, and the coding blocks are provided as one input of a motion estimation component 320, as one input of an intra prediction component 324, and to a positive input of a combiner 302 (e.g., adder or subtractor or the like). Further, although not specifically shown, a prediction mode, i.e., inter-prediction or intra-prediction, for each input frame is selected and provided to a mode selector component and the entropy encoders 334.

The storage component 318 provides reference data to the motion estimation component 320 and to the motion compensation component 322. The reference data may include one or more previously encoded and decoded pictures, i.e., reconstructed pictures. In some embodiments, the storage component 318 is external memory, i.e., off-chip memory.

The motion estimation component 320 provides motion estimation information to the motion compensation component 322 and the entropy encoders 334. More specifically, the motion estimation component 320 performs tests on coding blocks based on multiple temporal prediction modes using reference data from storage 318 to choose the best motion vector(s)/prediction mode based on a coding cost. To test the prediction modes, the motion estimation component 320 may divide a coding block into prediction blocks according to the block size of a prediction mode. The motion estimation component 320 provides the selected motion vector (MV) or vectors and the selected prediction mode to the motion compensation component 322 and the selected motion vector (MV) to the entropy encoders 334. The motion compensation component 322 provides motion compensated inter prediction information to a selector switch 326 that includes motion compensated inter prediction blocks and the selected temporal prediction modes. The coding cost of the inter prediction blocks are also provided to the mode selector component.

The intra prediction component 324 provides intra prediction information to the selector switch 326 that includes intra prediction blocks and the corresponding spatial prediction modes. That is, the intra prediction component 324 performs spatial prediction in which tests based on multiple spatial prediction modes are performed on the coding block using previously encoded neighboring blocks of the frame from the buffer 328 to choose the best spatial prediction mode for generating an intra prediction block based on a coding cost. To test the spatial prediction modes, the intra prediction component 324 may divide a coding block into prediction blocks according to the block size of a prediction mode. Although not specifically shown, the spatial prediction mode of each intra prediction block provided to the selector switch 326 is also provided to the transform component 304. Further, although not specifically shown, the coding cost of the intra prediction blocks are also provided to the mode selector component.

The selector switch 326 selects between the motion-compensated inter prediction blocks from the motion compensation component 322 and the intra prediction blocks from the intra prediction component 324 based on the difference metrics of the blocks and a frame prediction mode provided by the mode selector component. The output of the selector switch 326, i.e., the predicted prediction block, is provided to a negative input of the combiner 302 and to a delay component 330. The output of the delay component 330 is provided to another combiner (i.e., an adder) 338. The combiner 302 subtracts the predicted prediction block from the current prediction block of the current coding block to provide a residual prediction block to the transform component 304. The resulting residual prediction block is a set of pixel difference values that quantify differences between pixel values of the original prediction block and the predicted prediction block.

The transform component 304 performs a block transform on the residual prediction blocks to convert the residual pixel values to transform coefficients and outputs the transform coefficients. The transform coefficients from the transform component 304 are provided to a quantization component 306 which outputs quantized transform coefficients. More specifically, the quantization component 306 divides the values of the transform coefficients of a residual prediction block by a quantization scale (Qs) derived from a quantization parameter (Qp) provided by the rate control component 338. In general, the quantization component 306 represents the coefficients by using a desired number of quantization steps, the number of steps used (or correspondingly the value of Qs or the values in the scaling matrix) determining the number of bits used to represent the residuals.

The rate control component 338 computes a base Qs for each coding block in accordance with a method for rate control as described herein and converts this base Qs to the appropriate QP value for use by the quantization component 306. As is described in more detail below in reference to FIGS. 4A and 4B, some embodiments of the rate control method generate the base Qs for a coding block by adapting a base Qs for a subGOP containing the coding block to a target bit rate in view of a number of factors including the current fullness of the video buffer 336.

Because the DCT transform redistributes the energy of the residual signal into the frequency domain, the quantized transform coefficients are taken out of their raster-scan ordering a scan component 308 and arranged by significance, such as, for example, beginning with the more significant coefficients followed by the less significant. The ordered quantized transform coefficients provided via the scan component 308 along with header information are coded by the entropy encoders 334, which provide a compressed bit stream 336 to the video buffer 336 for transmission or storage. The entropy coding performed by the entropy encoders 334 may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients provided via the scan component 308 are returned to their original post-transform arrangement by an inverse scan component 310, the output of which is provided to a dequantize component 312, which outputs estimated transformed information, i.e., an estimated or reconstructed version of the transform result from the transform component 304. The estimated transformed information is provided to the inverse transform component 314, which outputs estimated residual information which represents a reconstructed version of the residual prediction block. The reconstructed residual prediction block is provided to the combiner 338.

The combiner 338 adds the delayed selected prediction block to the reconstructed residual prediction block to generate an unfiltered reconstructed prediction block, which becomes part of reconstructed frame information. The reconstructed frame information is provided via a buffer 328 to the intra prediction component 324 and to a filter component 316. The filter component 316 is an in-loop filter which filters the reconstructed frame information and provides filtered reconstructed coding blocks, i.e., reference data, to the storage component 318.

Figure 4A:
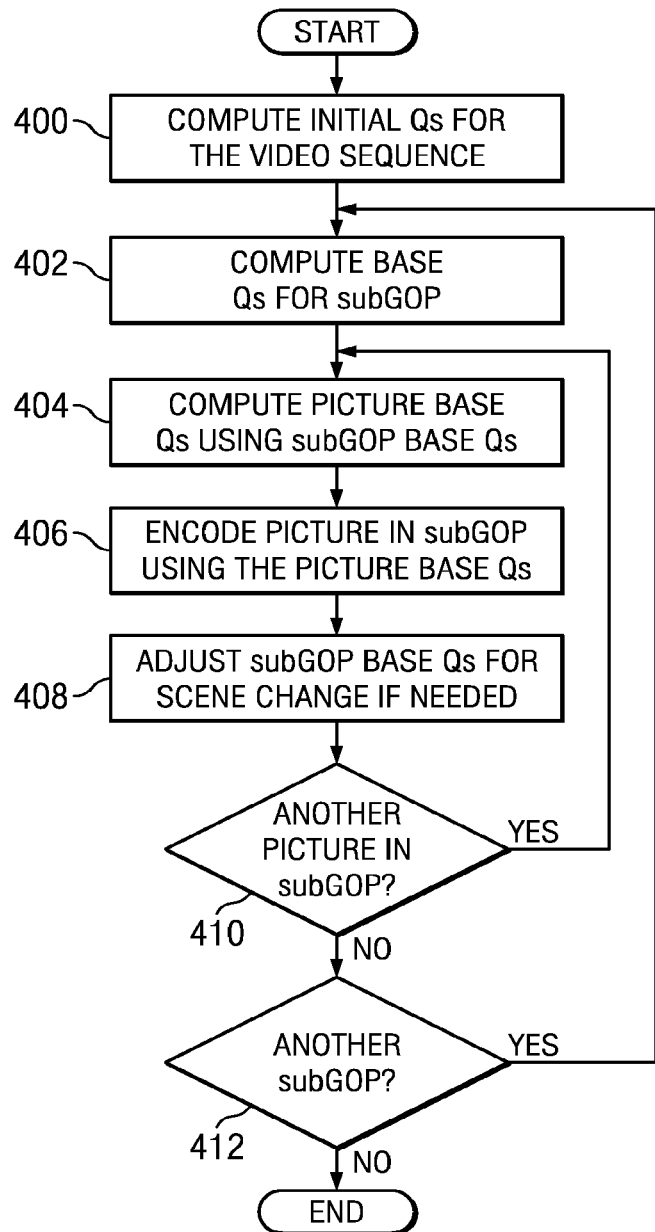
FIGS. 4A and 4B show flow diagrams of methods for rate control in accordance with one or more embodiments.
Figure 4B:
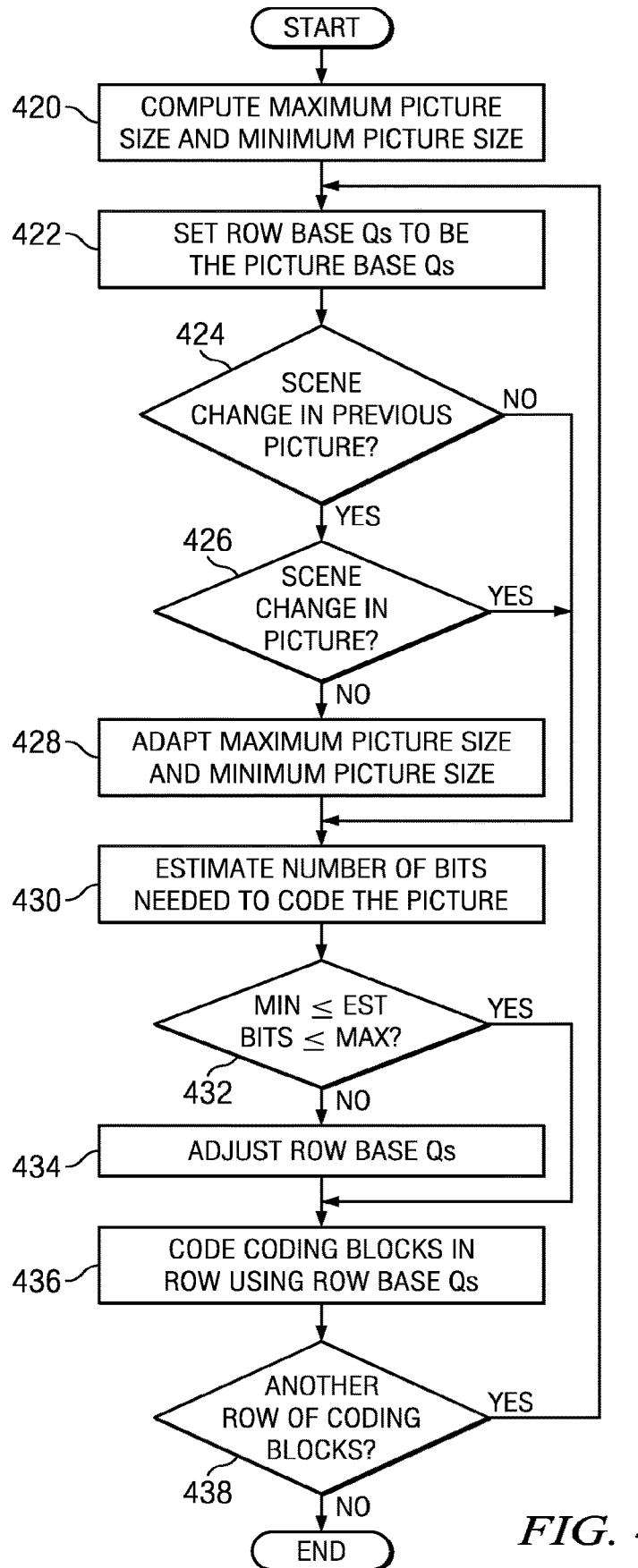

FIGS. 4A and 4B shows flow diagrams of methods for rate control in accordance with one or more embodiments. For simplicity of explanation, the methods are described assuming rate control at the sub-picture level is based on rows of coding blocks. One of ordinary skill in the art will understand embodiments in which rate control at the sub-picture level is based on coding blocks sequences that are smaller or larger than a row of a picture and may vary in length within a picture.

One or more embodiments of the rate control method compute a base Qs at the beginning of each subGOP in a video sequence 402. This subGOP base Qs is then used to compute a base Qs for each picture in the subGOP 404. A minimum and maximum coded size is also computed for each picture 420. The picture base Qs and the minimum and maximum picture sizes are then used to determine a base Qs for each row of coding blocks in the picture 430-438. More specifically, the row base Qs for a row may be increased or decreased as needed if the estimated coded size of the picture violates the minimum or maximum picture size 430-434. Further, if a scene change is detected during the encoding of a picture, the minimum and maximum picture size is adapted for each row in the first non-scene-change picture after the scene change is detected 424-428 to effect a special size restriction, which may be referred to as a scene change size restriction herein, on that picture. After the non-scene-change picture is coded, the subGOP base Qs is set to the average row base Qs for that picture prior to coding the next picture 408.

Special handling of scene changes is performed because the complexity of pictures before and after a scene change may be significantly different, which could adversely affect the quality of pictures coded after the scene change for some period of time unless something is done to mitigate the effects of the complexity change. For example, if picture complexity is very low before a scene change but very high after the scene change, the Qs values for the first few pictures in the new scene will be very low. This happens because the Qs value before the scene change would be very low to meet the target bit rate due to the very low complexity of the preceding pictures. Due to this, coding of the first few pictures in the new scene will consume a much larger number of bits as compared to the target bit rate. Thus, the Qs value over some number of subsequent pictures will be increased to a much higher value to meet the target bit rate. This will result in a few very good quality pictures at the beginning of the new scene followed by many pictures with poor quality.

In another example, if picture complexity is very high before a scene change but very low after the scene change, the Qs values used by the first few pictures in the new scene will be very high. This happens because the Qs value before the scene change would be very high to meet the target bit rate due to the very high complexity of the preceding pictures. Due to this, the first few pictures in the new scene will take a much smaller number of bits as compared to the target number of bits for a picture. This will result in many pictures at the beginning of the new scene with poor quality.

The adaptation of the minimum and maximum pictures sizes at the row level in the first non-scene-change picture after a scene change to impose a scene change size restriction is performed to generate a new value for the subGOP base Qs that provides for quicker stabilization after the scene change. As is explained in more detail below, the specific adaptations are based on minimum and maximum size thresholds empirically derived for generating the new value of the subGOP base Qs.

The steps of the methods of FIGS. 4A and 4B are now described in more detail. In describing the steps of the method, examples are provided in the form of pseudo code describing aspects an example implementation of an embodiment of the method. This pseudo code is provided for illustrative purposes only and should not be read as limiting. One of ordinary skill in the art will understand that the rate control method may be implemented in different ways. This pseudo code is expressed in the syntax of the C programming language and refers to various variables and constants defined in Table 10 provided at the end of this description. According, the pseudo code should be understandable by one of ordinary skill in the art without detailed explanation of the specific instructions and operations performed.

Some of the example pseudo code operates in the quantization parameter (Qp) domain and then either converts a Qp value to a Qs value or adjusts a Qs value based on a delta change in Qp. These operations are referenced respectively in the pseudo code as the subroutines Qp2Qs and addDelta2Quant. In some video coding standards, quantization step sizes are associated with integer-value quantization parameters having an integer value. Techniques for the conversion of Qp values to Qs values and the adjustment of a Qs value based on a delta Qp change are well known in the art. For example, a Qs for a Qp value may be determined using a table lookup and/or by computational derivation.

As shown in FIG. 4A, at the beginning of a video sequence, the initial Qs for the first picture in the video sequence is computed 400. Ideally, the initial Qs should be close to a steady state value of Qs to reduce video quality degradation that may otherwise occur at the beginning of a video sequence, i.e., at cold start. That is, the Qs used at the cold start may require adjustment over the coding of many pictures before it settles into a steady state if it is not set properly. For example, during the initial ramp period (rise time), if the Qs at the beginning is higher than the Qs once a steady state is reached, the perceived/measured quality will be worse during the ramp period than after stabilization. And, if the Qs at the beginning is lower than the Qs once a steady state is reached, more bits will be consumed for coding pictures during the ramp period than necessary and the video quality of pictures coded after the ramp period may be degraded for some time to make up for the over consumption of bits during the ramp period.

Accordingly, the initial Qs for a video sequence is computed based on the target bit rate such that a higher initial Qs is used for lower target bit rates and a lower initial Qs value is used for higher target bit rates. In some embodiments, the initial Qs is determined based the target bit rate for the video sequence, an empirically determined default Qs value for a low bit rate, and one or more empirically determined thresholds representative of higher bit rates—e.g., high and mid bit rates. The number of thresholds used may depend on the range of bit rates provided by a given video encoder. If the target bit rate of the video sequence is lower than the threshold(s) representative of higher bit rates, then the initial Qs is set to the default Qs. Otherwise, the default Qs value is decreased by some amount depending on the highest bit rate threshold it exceeds such that the higher the target bit rate, the more the default Qs value is decreased. The initial Qs value may also be determined based on specific coding techniques used in a video encoder that affect coding efficiency.

The pseudo code in Table 1 shows an example of dynamic determination of the initial Qs seqInitQs. In this example, two empirically determined thresholds are used, one representative of a high bit rate and one representative of a mid bit rate. Further, the comparative analysis of the target bit rate to the high and mid bit rates is based on a macroblock (MB) target bit rate targetBitsMB derived from the target bit rate. Note that this pseudo code determines an initial quantization parameter (Qp) and then converts that Qp to a Qs value (Qp2Qs). The default Qp value is empirically determined and will be used to determine the initial Qs unless the macroblock target bit rate is higher than one of the thresholds.

TABLE 1 targetBitsPerPic = targetBitsPerFrame;
if (fieldPicFlag) {
targetBitsPerPic = targetBitsPerPic >> 1; }
// If enabled, choose initial Qp dynamically based on target bit rate (bps)
if (dynamicInitQp) {
seqInitQp = defaultQP;
targetBitsMB = targetBitsPerPic / mbNs;
if (targetBitsMB > HIGH_RATE_MB_TH) {
seqInitQp = seqInitQp − 2;
} else if (targetBitsMB > MID_RATE_MB_TH) {
seqInitQp = seqInitQp − 1; }

Each subGOP in the video sequence is then coded 402-412. At the beginning of a subGOP, a base Qs for the subGOP is computed 402. Further, the base Qs for the subGOP is determined based on whether the subGOP is an I-subGOP or a P-subGOP. If the subGOP is an I-subGOP, the subGOP base Qs is computed based on the average row base Qs of each previously coded picture in the video sequence. That is, the average row base Qs of each picture in the video sequence coded before the current subGOP contributes to the value of the base Qs for the current subGOP. In some embodiments, the subGOP base Qs is computed as a running weighted average of the average row base Qs values of the previous pictures. This running weighted average may be computed after each picture is coded as $$curQsI = weightedAvg(\mod Qs, curQsI)$$

where weightedAvg(qa,qb)=qa*w1+qb*w2, and modQs=fun(avgQsCurPic). The values of the two weights may be empirically determined. In some embodiments, w1=0.75 and w2=0.25.

If the subGOP is an a P-subGOP, the subGOP base Qs is computed based on various rate control statistics from coding the previous P-subGOP in the video sequence. In some embodiments, the subGOP base Qs is the average Qs of the initial picture in the previous P-subGOP adapted by an adjustment factor for the discrepancy between the average number of bits consumed by a picture in the previous P-subGOP and the target bits per picture.

In some such embodiments, the computation of the subGOP base Qs for a P-subGOP is also based on the fullness of the video buffer. More specifically, rate control attempts to manage the fullness of the video buffer to reduce frame skipping and avoid buffer underflow by keeping the buffer fullness near a nominal buffer level. If the buffer fullness is above this nominal buffer level at the beginning of a P-subGOP, the computation of the subGOP base Qs may be biased to increase the Qs. And, if the buffer fullness is too low, the computation may be biased to decrease the Qs.

The computation of the subGOP base Qs for a P-subGOP may also take into account whether the VBR or CBR coding is being performed. Further, the computation may limit how much the subGOP base Qs can change between successive subGOPS.

The pseudo code in Table 2 shows an example of determining a base Qs for a subGOP. In this pseudo code, the subGOP base Qs, baseQsCurSubGop, is set to curQsI for an I-subGOP and is computed for a P-subGOP by applying an adjustment factor, globalAdj, to the average Qs of the initial picture in the previous P-subGOP, baseQsAvePrevPSub-Gop. The value of the adjustment factor, globalAdj, is computed based on the discrepancy between the average number of bits consumed by a picture in the previous P-subGOP, prevPtypeSubGopBits, and the target bits per picture, targetBitsPerPic, and a biasing value, vbconverge, determined based on the current level of fullness of the video buffer, vbLevel, as compared to a desired level of fullness, vbUseLevel. The value of the subGOP base Qs, baseQsCur-SubGop, is also not allowed to increase above a maximum Qs, maxQsLimit, that is dependent on whether VBR or CBR coding is being used.

The values of curQsI, baseQsPrevPSubGop, baseQsCur-SubGop, and baseQsAvePrevPSubGop are initialized for computation of the subGOP base Qs for the first subGOP in the video sequence based on the initial Qs, seqInitQs, for the video sequence. More specifically, baseQsPrevPSubGop=baseQsCurSubGop=baseQsAvePrev PSubGop=addDelta2Quant(seqInitQs, +rcIQPBoost and curQsI=baseQsPrevPSubGop. The value of rcIQPBoost may be empirically determined based on resulting visual quality. The value of prevPtypeSubGopBits is also initialized.

control hierarchy will have a higher picture base Qs than a picture in level n−1 of the rate control hierarchy.

The pseudo code in Table 3 shows an example of determining a base Qs for a picture using the subGOP base Qs. If the picture is an I-picture, the subGOP base Qs is raised by a fixed amount, −rcIQPBoost. If the picture is a P-picture at level 0 in the rate control hierarchy, the subGOP base Qs is not changed. For pictures at levels in the rate control hierarchy below level 0, the subGOP base Qs is reduced by a fixed amount, deltaQpPB, and further reduced according to the rate control hierarchy level of the picture, gopLevel.

TABLE 3

```
startOfPic( ) {
  if(picType == I_TYPE) {
    deltaQp = -rcIQPBoost;
  } else if(gopLevel == 0){
    deltaQp = 0;
  } else { // for B pics and other pics in the subGOP hierarchy
    deltaQp = deltaQpPB - 1 + gopLevel; }
  baseQsCurPic = addDelta2Quant(baseQsCurSubGop, deltaQp); }
```

Once the picture base Qs is computed 404, the picture is coded using the picture base Qs 406. Coding of a picture is explained in more detail below in reference to FIG. 4B. After the picture is coded, the subGOP base Qs may be adjusted

TABLE 2

```
curSubGOPBits = 0;
numPicInCurSubGOP = 0;
curSubGopType = picType;
if(curSubGopType == I_TYPE) {
  baseQsCurSubGop = curQsI;
} else if(curSubGopType == P_TYPE) {
  convergeShift = fieldPicFlag == false ? 3 : 4;
  if (vbLevel > vbUseLevel) {// getting high
    vbConverge = vbLevel >> convergeShift; // convergency factor
    // add no more than one output picture worth of bits
    vbConverge = min(vbConverge, targetBitsPerPic); // stability
  } else if (vbLevel < targetBitsPerPic) {// getting low
    vbConverge = -prevPtypeSubGopBits / 2; // convergency factor
  } else if (isVBR == true) {// below use level, have less aggressive adjustment
    vbConverge = vbLevel >> (convergeShift + 2);
    // add no more than one output picture worth of bits
    vbConverge = min(vbConverge, targetBitsPerPic >> 2); // stability}}
  bits = prevPtypeSubGopBits + vbConverge;
  globalAdj = ((bits - targetBitsPerPic) * pow(2.0, 10.0)) / (2 * targetBitsPerPic);
  baseQsCurSubGop = (baseQsAvePrevPSubGop * ((1 << 10) + globalAdj)) >> 10;
  if (isVBR == true) {
  // don't let cur subgop base Qp be more than 2 higher than prev subGOP base Qp
    maxQsLimit = addDelta2Quant (baseQsAvePrevPSubGop, MAX_QP_BET_ PIC_VBR);
  } else {
  // note that AvePrevPSubGop in not used here as in CBR it may go high often
    maxQsLimit = addDelta2Quant(baseQsPrevPSubGop, MAX_QP_BET_ PIC_CBR); }
  baseQsCurSubGop = min(baseQsCurSubGop, maxQsLimit);
} else if(picType == B_TYPE){
//error subGOP can not start with B picture}
```

Referring again to FIG. 4A, once the subGOP base Qs is computed 402, each picture in the subGOP is coded using the subGOP base Qs 404-410. At the beginning of a picture, a base Qs for the picture is computed using the subGOP base Qs 404. The picture base Qs is computed by adjusting the subGOP base Qs based on the type of the picture and the level of the picture in the rate control hierarchy. In general, I-pictures will have a smaller picture base Qs than the subGOP base Qs, P-pictures in level 0 of the rate control hierarchy will have a picture base Qs equal to the subGOP base Qs, and pictures in higher levels of the rate control hierarchy will have a higher picture base Qs than the subGOP base Qs. Further, a picture in level n of the rate prior to computing the picture base Qs for the next picture if a scene change has been detected and the picture just coded was the first non-scene-change picture after the scene change 408. As was previously explained, this adjustment is made to mitigate the degradation in coding quality that may occur if the complexity of pictures before and after a scene change is significantly different. If the above conditions are met, the subGOP base Qs is adjusted based on the average row base Qs for the non-scene-change picture. The average row base Qs may be computed by dividing the sum of the row base Qs values used in coding the picture by the number of rows in the picture.

This adjustment is performed prior to computing the picture base Qs for the next picture after the non-scene-change picture. Further, the adjustment may be dependent on the type of the non-scene-change picture. In some embodiments, if the non-scene-change picture is a P-picture, the subGOP base Qs is set to the average row base Qs of the non-scene-change picture. Further, if the non-scene-change picture is a B-picture, the subGOP base Qs is set to the average row base Qs adjusted for the level of the picture in the rate control hierarchy, i.e., so that the subGOP base Qs is higher than the average row base Qs and the delta change to the average row base Qs is higher for each successive level in the rate control hierarchy. The various statistics used in the computation of the subGOP base Qs for a P-subGOP are also adjusted as needed.

The pseudo code in Table 4 shows an example of adjusting the subGOP base QS for a scene change if needed. The flag updateBaseQsAfterSceneChange is used to indicate if the subGOP base Qs, baseQsCurSubGop, should be updated because of a scene change. The flag isNewScene indicates whether or not there was a scene change in the picture just coded. The value is isNewScene is updated by a scene detection technique that operates concurrently with rate control. Any suitable rate control technique may be used. Note that other variables used in the computation of a subGOP base Qs are also updated so that the change in the base Qs for the current subGOP will be reflected in the computation of the base Qs for the next P-subGOP.

In this pseudo code, if updateBaseQsAfterSceneChange is true, then a scene change was detected in a previously coded picture in the current subGOP. If isNewScene is false, then no scene change was detected in the picture just coded, i.e., the picture just coded is a non-scene-change picture. The value of baseQsCurSubGop is changed only if both these conditions are met. If the non-scene-change picture in the subGOP is a P-picture, baseQsCurSubGop is set to the average row Qs used in coding the non-scene-change picture, baseQsAvgCurPic. If the non-scene-change picture is a B-picture, baseQsCurSubGop is set to baseQsAvgCurPic reduced by a fixed amount, deltaQpPB, and further reduced according to the rate control hierarchy level of the picture, gopLevel.

After all pictures in a subGOP are coded 410, various statistics used in the computation of the subGOP base Qs for a P-subGOP are updated if the current subGOP is a P-subGOP. For example, the average Qs of the initial picture in the subGOP may be stored and the average number of bits used in coding a picture may be computed. The pseudo code in Table 5 shows an example of updating the statistics used in the computation of the subGOP base QS for a P-subGOP.

TABLE 5

```
if (curSubGopType == P_TYPE) {
if(numPicInCurSubGOP != 0){
prevPtypeSubGopBits = curSubGOPBits / numPicInCurSubGOP; }
// copy baseQp of cur P type GOP for next P type GOP for globalAdj computation
baseQsPrevPSubGop = baseQsCurSubGop;
baseQsAvePrevPSubGop = baseQsAvgCurSubGOP;}
```

FIG. 4B shows a method for performing step 406 of FIG. 4B, i.e., a method for coding a picture once the picture base Qs is computed using the subGOP base Qs. At the beginning of the picture, a maximum picture size and a minimum picture size are computed for the picture 420. The maximum picture size indicates the maximum number of bits to be used to code the picture and the minimum picture size indicates the minimum number of bits to be used to code the picture. In general, the maximum picture size is set to be larger than the target bits per picture. The maximum picture size may also differ for VBR and CBR coding, as a larger maximum picture size is more desirable for VBR coding while a smaller maximum picture size is more desirable for CBR coding. Other factors, such as the performance of the underlying hardware may also be considered in computing the maximum picture size. In some embodiments, the maximum picture size is computed as a multiple of the target bits per picture where the multiplication factor used for VBR coding is larger than that used for CBR coding. The multiplication factors may be empirically determined.

The minimum picture size is typically 0 for VBR coding. For CBR coding, the minimum picture size is set to reduce the possible variation in bit consumption over time. Further, the minimum picture size and the maximum picture size should not be very close as this may result in undue oscillation in Qs within the picture. To accomplish this, in some embodiments, the minimum picture size set to the lower of one half of the target bits per picture or one fourth of the maximum picture size.

The pseudo code in Table 6 shows an example of computing the maximum picture size, maxPicSize, and the pseudo code in Table 7 shows an example of computing the minimum picture size, minPicSize.

TABLE 4

```
if (updateBaseQsAfterSceneChange) {
if ((picType == P_TYPE) && (isNewScene == false)) {
baseQsAvgCurSubGOP= baseQsAvePrevPSubGop = baseQsPrevPSubGop =
baseQsCurSubGop = baseQsAvgCurPic;
updateBaseQsAfterSceneChange = false;
} else if ((picType == B_TYPE) && (isNewScene == false)) {
int deltaQp = deltaQpPB − 1 + gopLevel;
baseQsCurSubGop = addDelta2Quant(baseQsAvgCurPic, −deltaQp);
baseQsAvgCurSubGOP = baseQsAvePrevPSubGop = baseQsPrevPSubGop =
baseQsCurSubGop;
updateBaseQsAfterSceneChange = false;}
```

TABLE 6

```
if (isVBR == true) {
    maxFrmSizeTh = MAX_FRM_SIZE_TH_VBR;
} else {
    maxFrmSizeTh = MAX_FRM_SIZE_TH_CBR;}
maxPicSize = targetBitsPerPic * maxFrmSizeTh;
```

TABLE 7

```
minPicSize = 0;
if (isVBR != true) {
    minPicSize = (targetBitsPerPic >> 1);
    // min pic size cannot be same or higher than max pic size
    minPicSize = min(minPicSize, (maxPicSize >> 2);
```

Referring again to FIG. 4B, after the minimum and maximum picture sizes are computed 420, each row of coding blocks in the picture is coded using the picture base Qs and the minimum and maximum picture sizes 422-438. First, the row base Qs is set to be the picture base Qs 422. If there was no scene change in the previous picture 424, the number of bits needed to code the picture at this point in time if the current value of row base Qs is used is estimated 430. If the estimated size is above the maximum picture size or below the minimum picture size 432, the row base Qs is adjusted 434. More specifically, the row base Qs for the current row is increased or decreased as needed to meet the picture size restrictions. If the estimated size does not violate the picture size restrictions 432, the row level Qs is not changed. The coding blocks in the row are then coded using the row base Qs.

If there was a scene change in the previous picture 424, then a check is made to determine if a scene change has been detected in the current picture 426. Scene change detection is performed concurrently with rate control and may signal a scene change by setting a scene change indicator while the picture is being coded. If a scene change has been detected 426, the row is coded 430-436 using the current values of maximum picture size and minimum picture size. These values may not be the same as the values computed at the beginning of the picture 420 as they may have been adapted 428 before the scene change in the picture was detected.

If a scene change has not been detected 426, the maximum and minimum picture sizes are adapted for the row 428. This adaptation restricts the maximum and minimum picture sizes according to size thresholds selected to yield an average row base Qs for the picture that is suitable for use as the subGOP base Qs going forward, i.e., to yield new value for the subGOP base Qs that will result in faster stabilization after the scene change. The particular size thresholds used to adaptation the maximum and minimum picture sizes are selected based on the type of the current picture. More specifically, the adapted maximum picture size for an I-picture will be larger than the adapted maximum picture size for a P-picture which will be larger than the adapted maximum picture size for a B-picture. Similarly, the adapted minimum picture size for an I-picture will be larger than the adapted minimum picture size for a P-picture which will be larger than the adapted minimum picture size for a B-picture.

Further, in some embodiments, the adapted maximum picture size, regardless of picture type, is a multiple of the target bits per picture. That is, the maximum size thresholds are empirically determined multiplication factors that are applied to the target bits per picture to compute the adapted maximum picture size. Similarly, the adapted minimum picture size, regardless of picture type, is based on the target bits per picture. For a I-picture, the adapted minimum picture size is the target bits per picture divided by a factor determined based on the number of P and or B-pictures in a GOP. For a P-picture, the adapted minimum picture size is the target bits per picture. For a B-picture, the adapted minimum picture size is one half of the target bits per picture.

The pseudo code in Table 8 shows an example of computing the maximum picture size, maxPicSize, at the row level and the pseudo code in Table 9 shows an example of computing the minimum picture size, minPicSize, at the row level.

TABLE 8

```
if (isVBR == true) {
maxFrmSizeTh = MAX_FRM_SIZE_TH_VBR;
if (updateBaseQsAfterSceneChange) {
if (picType == I_TYPE) {
maxFrmSizeTh = min(maxFrmSizeTh, MAX_FIRST_FRM_SIZE_TH_I);
} else if ((!isNewScene) && (picType == P_TYPE)) {
maxFrmSizeTh = min(maxFrmSizeTh, MAX_FIRST_FRM_SIZE_TH_P);
} else if ((!isNewScene) && (picType == B_TYPE)) {
maxFrmSizeTh = min(maxFrmSizeTh, MAX_FIRST_FRM_SIZE_TH_P >> 1); }}
maxPicSize = min(maxPicSize, targetBitsPerPic * maxFrmSizeTh);
```

TABLE 9

```
if (updateBaseQsAfterSceneChange && isVBR) {
if (picType == I_TYPE) {
minPicSize = targetBitsPerPic << facIPicAvgShft;
} else if ((picType == P_TYPE) && !isNewScene) {
minPicSize = targetBitsPerPic;
} else if ((picType == B_TYPE) && !isNewScene)
minPicSize = targetBitsPerPic >> 1; }
// min pic size cannot be same or higher than max pic size
minPicSize = min(minPicSize, (maxPicSize * 7) >> 3);
```

Referring again to FIG. 4B, after the minimum and maximum picture sizes are adapted 428, the row is coded 430-436 using the adapted values of maximum picture size and minimum picture size.

After all rows in the picture are coded 438, the running weighted average used to set the value of the subGOP base Qs for an I-subGOP is updated with the average Qs used in coding the picture. An indicator used to signal that a scene change was detected in the previous picture is also managed at this level. If a scene change was detected in coding the current picture, the indicator is set to signal that the scene change was detected. Further, if the picture is the first non-scene-change picture after a scene change was detected, the indicator is set to signal that no scene change has been detected. Note that the picture is the first non-scene change picture if this indicator signaled a scene change in the previous picture when coding of the picture was started and no scene change was detected while coding the picture. This indicator is called updateBaseQsAfterSceneChange in the pseudo code examples.

It will be appreciated there may also be video quality degradation at the beginning of a video sequence, i.e., at cold start, for reasons similar to those described above for a scene change. That is, unless somehow mitigated, the Qs used at the cold start may require adjustment over the coding of many pictures before it settles into a steady state. In some embodiments, the cold start at the beginning of the video sequence is handled by initializing the rate control to treat the first picture in the video sequence as the first picture in a new scene, i.e., a picture in which a scene change has occurred. Thus, the rate control will also take steps to manage the Qs in the initial non-scene-change picture after the first picture as previously described.

The rate control techniques described in this disclosure may be implemented in hardware, software, firmware, or any combination thereof. If any part or all of a rate control technique is in software, the software may be executed in one or more processors, such as a microprocessor, application specific integrated circuit (ASIC), field programmable gate array (FPGA), or digital signal processor (DSP). The software may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 5:
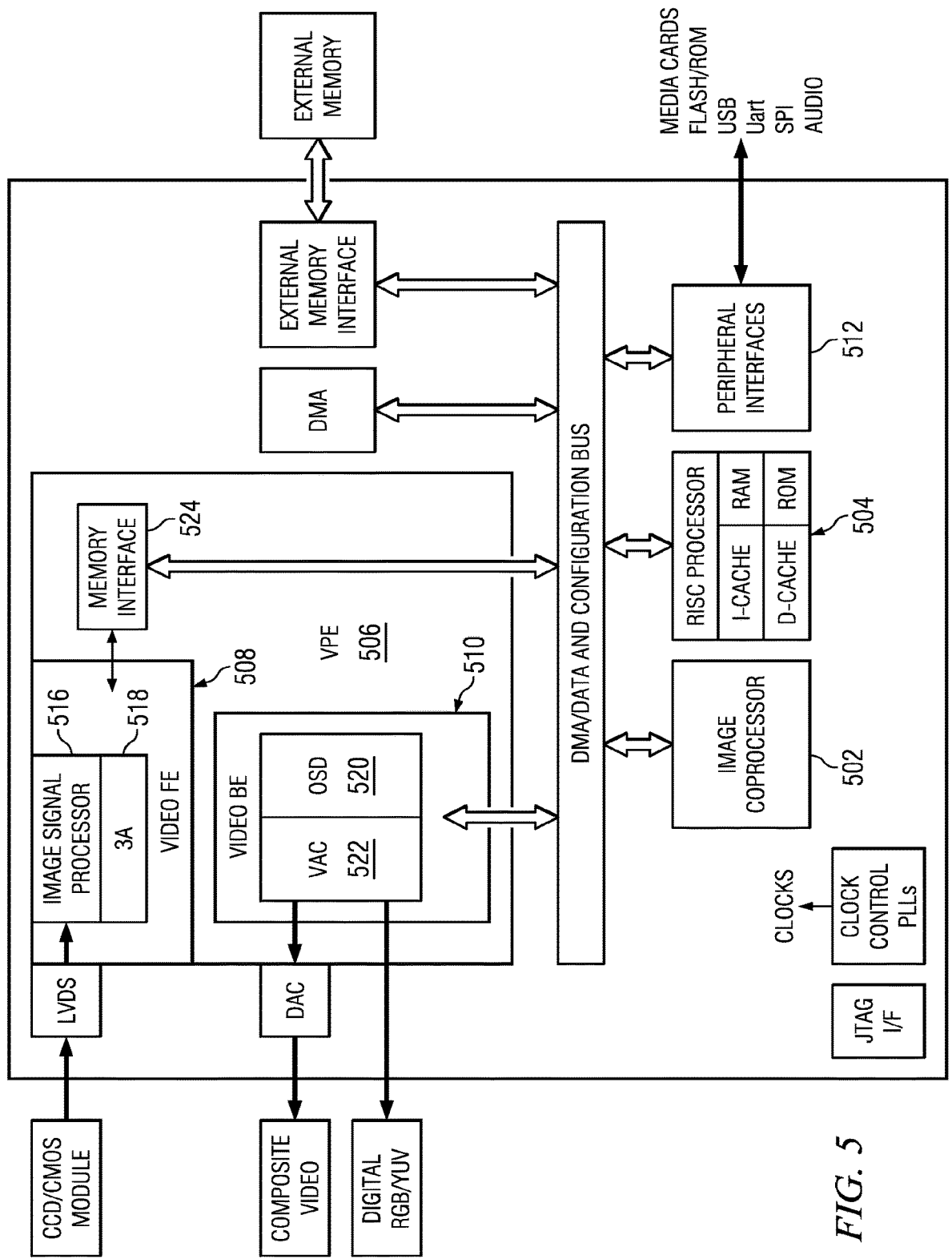
FIGS. 5-7 show illustrative digital systems in accordance with one or more embodiments.
Figure 6:
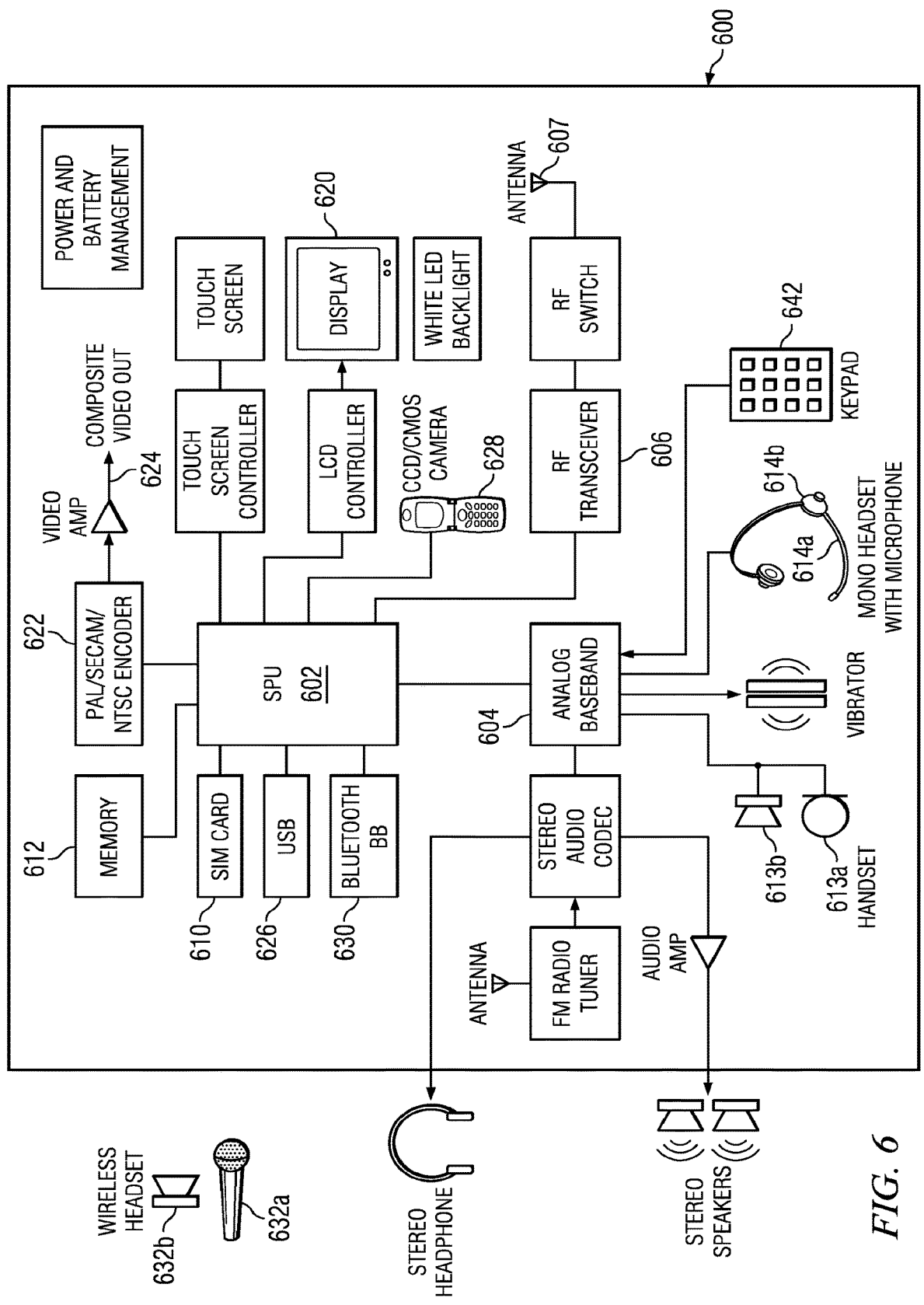
Figure 7:
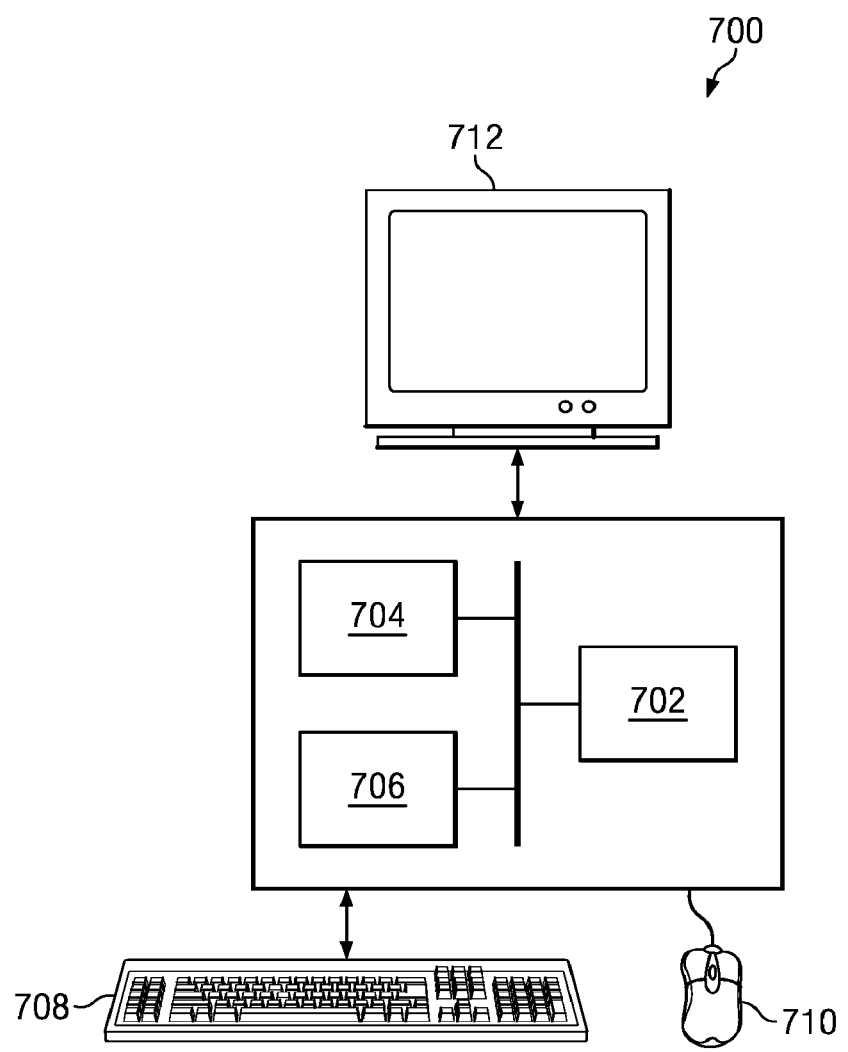

Embodiments of the methods and systems for rate control as described herein may be implemented for virtually any type of digital system (e.g., a desk top computer, a laptop computer, a handheld device such as a mobile (i.e., cellular) phone or MP3 player, a personal digital assistant, a digital video camera, a set top box, a digital video recorder (DVR), etc. with functionality to capture or otherwise generate digital video sequences. FIGS. 5-7 show block diagrams of illustrative digital systems.

FIG. 5 shows a digital system suitable for an embedded system (e.g., a digital camera) in accordance with one or more embodiments that includes, among other components, a DSP-based image coprocessor (ICP) 502, a RISC processor 504, and a video processing engine (VPE) 506 that may be configured to perform a rate control method described herein. The RISC processor 504 may be any suitably configured RISC processor. The VPE 506 includes a configurable video processing front-end (Video FE) 508 input interface used for video capture from imaging peripherals such as image sensors, video decoders, etc., a configurable video processing back-end (Video BE) 510 output interface used for display devices such as SDTV displays, digital LCD panels, HDTV video encoders, etc, and memory interface 524 shared by the Video FE 508 and the Video BE 510. The digital system also includes peripheral interfaces 512 for various peripherals that may include a multi-media card, an audio serial port, a Universal Serial Bus (USB) controller, a serial port interface, etc.

The Video FE 508 includes an image signal processor (ISP) 516, and a 3A statistic generator 3A) 518. The ISP 516 provides an interface to image sensors and digital video sources. More specifically, the ISP 516 may accept raw image/video data from a sensor (CMOS or CCD) and can accept YUV video data in numerous formats. The ISP 516 also includes a parameterized image processing module with functionality to generate image data in a color format (e.g., RGB) from raw CCD/CMOS data. The ISP 516 is customizable for each sensor type and supports video frame rates for preview displays of captured digital images and for video recording modes. The ISP 516 also includes, among other functionality, an image resizer, statistics collection functionality, and a boundary signal calculator. The 3A module 518 includes functionality to support control loops for auto focus, auto white balance, and auto exposure by collecting metrics on the raw image data from the ISP 516 or external memory.

The Video BE 510 includes an on-screen display engine (OSD) 520 and a video analog encoder (VAC) 522. The OSD engine 520 includes functionality to manage display data in various formats for several different types of hardware display windows and it also handles gathering and blending of video data and display/bitmap data into a single display window before providing the data to the VAC 522 in YCbCr format. The VAC 522 includes functionality to take the display frame from the OSD engine 520 and format it into the desired output format and output signals required to interface to display devices. The VAC 522 may interface to composite NTSC/PAL video devices, S-Video devices, digital LCD devices, high-definition video encoders, DVI/HDMI devices, etc.

The memory interface 524 functions as the primary source and sink to modules in the Video FE 508 and the Video BE 510 that are requesting and/or transferring data to/from external memory. The memory interface 524 includes read and write buffers and arbitration logic.

The ICP 502 includes functionality to perform computational operations required for video encoding of captured images. The video encoding standards supported may include, for example, one or more of the JPEG standards, the MPEG standards, and the H.26x standards. In one or more embodiments, the ICP 502 is configured to perform the computational operations of a rate control method described herein during the video encoding.

FIG. 6 is a block diagram of a digital system (e.g., a mobile cellular telephone) 600 that may be configured to perform rate control as described herein. The signal processing unit (SPU) 602 includes a digital processing processor system (DSP) that includes embedded memory and security features. The analog baseband unit 604 receives a voice data stream from handset microphone 613a and sends a voice data stream to the handset mono speaker 613b. The analog baseband unit 604 also receives a voice data stream from the microphone 614a) and sends a voice data stream to the mono headset 614b. The analog baseband unit 604 and the SPU 602 may be separate ICs. In many embodiments, the analog baseband unit 604 does not embed a programmable processor core, but performs processing based on configuration of audio paths, filters, gains, etc being setup by software running on the SPU 602. In some embodiments, the analog baseband processing is performed on the same processor and can send information to it for interaction with a user of the digital system 600 during a call processing or other processing.

The display 620 may also display pictures and encoded video streams received from the network, from a local camera 628, or from other sources such as the USB 626 or the memory 612. The SPU 602 may also send a video stream to the display 620 that is received from various sources such as the cellular network via the RF transceiver 606 or the camera 628. The SPU 602 may also send a video stream to an external video display unit via the encoder 622 over a composite output terminal 624. The encoder unit 622 may provide encoding according to PAL/SECAM/NTSC video standards.

The SPU 602 includes functionality to perform the computational operations required for video encoding and decoding. The video encoding standards supported may include, for example, one or more of the JPEG standards, the MPEG standards, the H.26x standards, and the emerging HEVC standard. In one or more embodiments, the SPU 602 is configured to perform the computational operations of rate control during video encoding as described herein. Software instructions implementing all or part of the rate control may be stored in the memory 612 and executed by the SPU 602 as part of encoding of digital image data, e.g., pictures and video streams.

FIG. 7 shows a digital system 700 (e.g., a personal computer) that includes a processor 702, associated memory 704, a storage device 706, and numerous other elements and functionalities typical of digital systems (not shown). In one or more embodiments, a digital system may include multiple processors and/or one or more of the processors may be digital signal processors. The digital system 700 may also include input means, such as a keyboard 708 and a mouse 710 (or other cursor control device), and output means, such as a monitor 712 (or other display device). Those skilled in the art will appreciate that the input and output means may take other forms. The digital system 700 may also include an image capture device (not shown) that includes circuitry (e.g., optics, a sensor, readout electronics) for capturing video sequences. The digital system 700 may include a video encoder with functionality to perform rate control as described herein.

The digital system 700 may be connected to a network (not shown) (e.g., a local area network (LAN), a wide area network (WAN) such as the Internet, a cellular network, any other similar type of network and/or any combination thereof) via a network interface connection (not shown). The digital system 1500 may include functionality to receive encoded video sequences via the network interface connection, from the storage device 1506, and/or from removable storage media.

Further, those skilled in the art will appreciate that one or more elements of the aforementioned digital system 700 may be located at a remote location and connected to the other elements over a network. Further, embodiments may be implemented on a distributed system having a plurality of nodes, where each portion of the system and software instructions may be located on a different node within the distributed system. In one embodiment, the node may be a digital system. Alternatively, the node may be a processor with associated physical memory. The node may alternatively be a processor with shared memory and/or resources.

Software instructions to perform computational operations of rate control as described herein may be stored on a computer readable medium such as a compact disc (CD), a diskette, a tape, a file, memory, or any other computer readable storage device. The software instructions may be distributed to the digital system 700 via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

TABLE 10

| Name | Description |
| --- | --- |
| targetBitsPerFrame | Target average bits per frame or bit rate/frames per second |
| deltaQpPB | Delta Qp between P and B picture types, B Pic Qp = P Pic Qp + deltaQpPB |
| isVBR | Indicates use of variable rate control. False indicates constant bit-rate (CBR) rate control |
| fieldPicFlag | indicates interlace (field coding) mode is chosen |
| dynamicInitQp | Indicates whether or not to choose initial Qs dynamically |
| seqInitQs | Initial Qs computed at the beginning of the sequence |
| rcIQPBoost | Fixed Qp boost given to I pictures compared to neighboring P pictures |
| facIPicAvgShft | Average bits of I picture over average bits. Depends on GOP size. |
| curSubGopType | Current subGOP type: I or P, first picture type in the subGOP decides subGOP type |
| baseQsCurSubGop | Base Qs of current subGOP |
| baseQsAvgCurSubGOP | Average base Qs after row level adjust for the first picture in the current subGOP |
| curSubGOPBits | Bits consumed in the current subGOP |
| numPicInCurSubGOP | Number of pictures in the current subGOP |
| baseQsAvePrevPSubGop | Average Qs of base Qs of previous P-subGOP |
| baseQsPrevPSubGop | Base Qs of previous P-subGOP |
| prevPtypeSubGopBits | Bits consumed in previous P-subGOP |
| baseQsCurPic | Base Qs of current picture, derived from base Qs of current subGOP. |
| baseQsAvgCurPic | Average base Qs after row level adjust for the current picture, derived from rc_baseQsSumCurPic |
| baseQsSumCurPic | Summed up base Qs after row level adjust for the current picture |
| picType | picture coding type: I, P or B |
| bitCount | Bits consumed by current picture |

TABLE 10-continued

| Name | Description |
|---|---|
| curQsI | Running Qs for I-pictures |
| gopLevel | GOP level, I and P level-0, B level-1, hierarchical coding will have additional levels |
| updateBaseQsAfterSceneChange | Indicates subGOP base Qs needs to be updated after scene change or at the beginning of the sequence |
| targetBitsPerPic | Target average bits per picture |
| mbNs | Number of macroblocks in the current picture |
| qScaleMax | Maximum Qs for current picture type |
| qScaleMin | Minimum Qs for current picture type |
| isNewScene | Indicates if current picture is new scene change. Not valid for I picture type |
| maxPicSize | Maximum target picture size for the current picture |
| minPicSize | Minimum target picture size for the current picture |
| MAX_FRM_SIZE_TH_VBR | Multiplication factor for determining maximum picture size for VBR |
| MAX_FRM_SIZE_TH_CBR | Multiplication factor for determining maximum picture size for CBR |
| HIGH_RATE_MB_TH | Threshold for a high macroblock rate |
| MID_RATE_MB_TH | Threshold for a mid macroblock rate |

What is claimed is:

1. A method comprising:
   determining, with one or more processors, whether an initial picture in a sequence of pictures for a video sequence is an intracoded picture or a predicted picture, wherein the sequence of pictures includes:
      the initial picture in the sequence of pictures is a level 0 frame; and
      remaining pictures in the sequence of pictures are not a level 0 frame;
   computing, with the one or more processors, a sequence base quantization step size value for the sequence of pictures according to a first technique in response to determining that the initial picture in the sequence of pictures is the intracoded picture;
   computing, with the one or more processors, the sequence base quantization step size for the sequence of pictures according to a second technique in response to determining that the initial picture in the sequence of pictures is a predicted picture, the second technique being different than the first technique; and
   for each of the predicted pictures in the sequence of pictures:
      adjusting the sequence base quantization step size value that is computed for the sequence of pictures based on whether variable bit rate or constant bit rate coding is being performed and a level of the respective predicted picture in a rate control hierarchy to generate a picture base quantization step size for the respective predicted picture;
      coding, with the one or more processors, the respective predicted picture using the picture base quantization step size for the respective predicted picture to generate a portion of a compressed bit stream; and
      responsive to a scene change in the video sequence, adapting the sequence base quantization step size value based on an average of quantization step sizes used in coding an initial non-scene-change picture after the scene change.

2. The method of claim 1, wherein computing the sequence base quantization step size value according to the first technique includes computing the sequence base quantization step size value as a weighted average of average quantization step sizes of previously coded pictures in the video sequence.

3. The method of claim 2, wherein coding the respective picture further includes:
   computing a minimum number of bits to be used in coding the respective picture and a maximum number of bits to be used in coding the respective picture; and
   coding the respective picture using a number of bits greater than the minimum number of bits and less than the maximum number of bits.

4. The method of claim 3, wherein coding the respective picture using a number of bits further includes:
   estimating a number of bits needed to code the respective picture before coding a sequence of coding blocks in the respective picture;
   increasing a quantization step size for the sequence of coding blocks when the estimated number of bits is larger than the maximum number of bits; and
   decreasing the quantization step size for the sequence of coding blocks when the estimated number of bits is smaller than the minimum number of bits.

5. The method of claim 3, wherein coding the respective picture further includes:
   adapting the minimum number of bits and the maximum number of bits for rate control of a sequence of coding blocks in the respective picture when a scene change is detected in a picture immediately preceding the picture in the sequence of pictures.

6. The method of claim 1, further including:
   responsive to a scene change in the video sequence, adjusting the sequence base quantization step size prior to computing the picture base quantization step size for a subsequent picture in the sequence of pictures.

7. The method of claim 1, wherein computing the sequence base quantization step size according to the second technique includes computing the sequence base quantization step size based on an average number of bits consumed by a previous sequence of pictures in the video sequence and an average quantization step size used in coding an initial picture in the previous sequence of pictures.

8. An encoder comprising one or more processors configured to:
   determine whether an initial picture in a sequence of pictures for a video sequence is an intracoded picture or a predicted picture, wherein the sequence of pictures includes:
      the initial picture in the sequence of pictures is a level 0 frame; and remaining pictures in the sequence of pictures are not a level 0 frame;

compute a sequence base quantization step size value for the sequence of pictures according to a first technique in response to determining that the initial picture in the sequence of pictures is the intracoded picture;

compute the sequence base quantization step size for the sequence of pictures according to a second technique in response to determining that the initial picture in the sequence of pictures is a predicted picture, the second technique being different than the first technique; and for each of a plurality of predicted pictures in the sequence of pictures:
adjust the sequence base quantization step size value that is computed for the sequence of pictures based on whether variable bit rate or constant bit rate coding is being performed and a level of the respective predicted picture in a rate control hierarchy to generate a picture base quantization step size for the respective predicted picture;
code the respective predicted picture using the picture base quantization step size for the respective predicted picture to generate a portion of a compressed bit stream; and responsive to a scene change in the video sequence, adapt the sequence base quantization step size based on an average of quantization step sizes used in coding an initial non-scene-change picture after the scene change.

9. The encoder of claim 8, wherein the one or more processors are further configured to:
when the initial picture in the sequence of pictures is an intracoded picture, compute the sequence base quantization step size value as a weighted average of average quantization step sizes of previously coded pictures in the video sequence.

10. The encoder of claim 9, wherein the one or more processors are further configured to:
compute a minimum number of bits to be used in coding the picture and a maximum number of bits to be used in coding the picture, wherein the quantization step size is increased or decreased as the picture is coded to guarantee that a number of bits used to code the picture is greater than the minimum number of bits and less than the maximum number of bits.

11. The encoder of claim 10, wherein the one or more processors are further configured to:
estimate a number of bits needed to code the picture before coding a sequence of coding blocks in the picture;
increase a quantization step size for the sequence of coding blocks when the estimated number of bits is larger than the maximum number of bits; and
decrease the quantization step size for the sequence of coding blocks when the estimated number of bits is smaller than the minimum number of bits.

12. The encoder of claim 9, wherein the minimum number of bits and the maximum number of bits is adapted for rate control of a sequence of coding blocks in the picture when a scene change is detected in a picture immediately preceding the picture in the sequence of pictures.

13. The encoder of claim 8, wherein the one or more processors are further configured to:
responsive to a scene change in the video sequence, adjust the sequence base quantization step size prior to computing the picture base quantization step size for a subsequent picture in the sequence of pictures.

14. The encoder of claim 8, wherein the one or more processors are further configured to:
when the initial picture in the sequence of pictures is a predicted picture, compute the sequence base quantization step size based on an average number of bits consumed by a previous sequence of pictures in the video sequence and an average quantization step size used in coding an initial picture in the previous sequence of pictures.

15. A non-transitory machine readable medium storing instructions, wherein execution of the instructions by a processor in a video encoder causes the video encoder to:
determine whether an initial picture in a sequence of pictures for a video sequence is an intracoded picture or a predicted picture, wherein the sequence of pictures includes:
the initial picture in the sequence of pictures is a level 0 frame; and
remaining pictures in the sequence of pictures are not a level 0 frame;

compute a sequence base quantization step size value for sequence of pictures according to a first technique or second technique based on whether the initial picture in the sequence of pictures is an intracoded picture or a predicted picture, the second technique being different than the first technique;

for each of the predicted pictures in the sequence of pictures:
adjust the sequence base quantization step size value that is computed for the sequence of pictures based on whether variable bit rate or constant bit rate coding is being performed and a level of the respective predicted picture in a rate control hierarchy to generate a picture base quantization step size for the respective predicted picture;
code the respective predicted picture using the respective picture base quantization step size for the respective predicted picture to generate a portion of a compressed bit stream; and responsive to a scene change in the video sequence, adapting the sequence base quantization step size value based on an average of quantization step sizes used in coding an initial non-scene-change picture after the scene change.

16. The machine readable medium of claim 15, wherein the instructions that cause the video encoder to compute the sequence base quantization step size value include instructions that cause the video encoder to:
when an initial picture in the sequence of pictures is an intracoded picture, compute the sequence base quantization step size value as a weighted average of average quantization step sizes of previously coded pictures in the video sequence.

17. The machine readable medium of claim 15, wherein the instructions that cause the video encoder to code the respective picture further include instructions that cause the video encoder to:
compute a minimum number of bits to be used in coding the picture and a maximum number of bits to be used in coding the picture; and
code the picture using a number of bits greater than the minimum number of bits and less than the maximum number of bits.

18. The machine readable medium of claim 17, wherein the instructions that cause the video encoder to code the respective picture using a number of bits further include instructions that cause the video encoder to:

estimate a number of bits needed to code the picture before coding a sequence of coding blocks in the picture;

increase a quantization step size for the sequence of coding blocks when the estimated number of bits is larger than the maximum number of bits; and decrease the quantization step size for the sequence of coding blocks when the estimated number of bits is smaller than the minimum number of bits.

19. The machine readable medium of claim 18, the instructions that cause the video encoder to code the respective picture further include instructions that cause the video encoder to:

adjust the sequence base quantization step size prior to computing the picture base quantization step size for a subsequent picture in the sequence of pictures-when a scene change is detected in a picture immediately preceding the picture in the sequence of pictures.

20. The machine readable medium of claim 15, wherein the instructions further cause the video encoder to:

responsive to a scene change in the video sequence, adapt the sequence base quantization step size value based on an average of quantization step sizes used in coding an initial non-scene-change picture after the scene change.

* * * * *